US008583082B2

United States Patent
Gu et al.

(10) Patent No.: US 8,583,082 B2
(45) Date of Patent: Nov. 12, 2013

(54) SYSTEM AND METHOD FOR TRACKING STOLEN COMMUNICATION TERMINAL, AND COMMUNICATION TERMINAL

(75) Inventors: Zhan Gu, Huizhou (CN); Jianliang Gu, Huizhou (CN)

(73) Assignee: Huizhou TCL Mobile Communication Co., Ltd., Huizhou, Guangdong (CN)

( * ) Notice: Subject to any disclaimer, the term of this patent is extended or adjusted under 35 U.S.C. 154(b) by 0 days.

(21) Appl. No.: 13/520,846

(22) PCT Filed: Aug. 29, 2011

(86) PCT No.: PCT/CN2011/079072
§ 371 (c)(1),
(2), (4) Date: Jul. 6, 2012

(87) PCT Pub. No.: WO2012/028082
PCT Pub. Date: Mar. 8, 2012

(65) Prior Publication Data
US 2012/0309432 A1 Dec. 6, 2012

(30) Foreign Application Priority Data

Sep. 3, 2010 (CN) .......................... 2010 1 0278616

(51) Int. Cl.
*H04M 1/66* (2006.01)
*H04W 24/00* (2009.01)
(52) U.S. Cl.
USPC ........................................ 455/411; 455/456.6
(58) Field of Classification Search
USPC ................ 455/410, 411, 456.1, 456.2, 456.3, 455/456.5, 456.6
See application file for complete search history.

(56) References Cited

U.S. PATENT DOCUMENTS

| 8,306,522 B1* | 11/2012 | Delker et al. ................. 455/419 |
| 2001/0016486 A1* | 8/2001 | Ko ................. 455/411 |
| 2008/0070631 A1* | 3/2008 | Kumar .......................... 455/558 |
| 2008/0076459 A1* | 3/2008 | Shaju ............................. 455/466 |
| 2009/0305668 A1* | 12/2009 | Ahn et al. ..................... 455/410 |
| 2010/0099383 A1* | 4/2010 | Yamagishi ..................... 455/411 |

FOREIGN PATENT DOCUMENTS

| CN | 2739047 Y | 11/2005 |
| CN | 101459721 A | 6/2009 |
| CN | 101772018 A | 7/2010 |
| CN | 101951548 A | 1/2011 |

OTHER PUBLICATIONS

SIPO Office Action, dated Apr. 1, 2013, for CN priority application 201010278616.7, corresponding to the current U.S. Appl. No. 13/520,846.
PCT International Search Report, dated Dec. 1, 2011 for the current US national stage U.S. Appl. No. 13/520,846.

* cited by examiner

*Primary Examiner* — Christopher M Brandt
(74) *Attorney, Agent, or Firm* — Shimokaji & Associates P.C.

(57) ABSTRACT

A system and method for tracking a stolen communication terminal and a communication terminal provide tracking of a thief. The system comprises: a communication terminal and a standby server for receiving theft tracking information; the communication terminal comprises: a radio frequency module, a camera for taking pictures, a storage module for storing data, a baseband module for setting anti-theft protection information, and a GPS module for obtaining current positioning information; wherein the radio frequency module, the camera, the storage module and the GPS module are connected with the baseband module. When the communication terminal is stolen, facial pictures of the thief obtained by the camera and current positioning information of the communication terminal obtained by the GPS module are sent to a standby server.

20 Claims, 2 Drawing Sheets

SYSTEM AND METHOD FOR TRACKING STOLEN COMMUNICATION TERMINAL, AND COMMUNICATION TERMINAL

TECHNICAL FIELD OF THE INVENTION

The invention relates to the technical field of communications, and in particular to a system and method for tracking a stolen communication terminal and a communication terminal.

BACKGROUND OF THE INVENTION

With the development of mobile phone technology, cameras and GPS positioning modules or the like have become general configurations of mobile phones. The theft or loss of mobile phones happens frequently in our daily lives. Generally, it is difficult to recover mobile phones after they are stolen. This not only results in property loss to the owner, but also results in lost contact information of some important persons and privacy, so it brings inconvenience to the owner. In addition, the thief cannot be restrained and the act of theft cannot be prevented. As a result, rampancy of theft is caused, and the social order is disrupted.

SUMMARY OF THE INVENTION

In consideration of shortcomings of the existing technologies, an object of the invention is to provide a system for tracking a stolen communication terminal, so that theft tracking information of the communication terminal can be obtained after the communication terminal is stolen in order to recover the stolen communication terminal.

To realize the above purpose, the invention employs the following technical solution:

a system for tracking a stolen communication terminal is provided, wherein it comprises a communication terminal and a standby server for receiving theft tracking information; the communication terminal comprises: a radio frequency module, a camera for taking pictures, a storage module for storing data, a baseband module for setting anti-theft protection information, and a GPS module for obtaining current positioning information of the communication terminal; and the radio frequency module, the camera, the storage module and the GPS module are connected with the baseband module.

The system for tracking a stolen communication terminal is provided, wherein the communication terminal further comprises a password unit for setting and verifying a password, and the password unit is connected with the baseband module.

The system for tracking a stolen communication terminal is provided, wherein the standby server is a standby communication terminal or standby email box.

The system for tracking a stolen communication terminal is provided, wherein the theft tracking information includes the pictures taken by the camera and the positioning information obtained by the GPS module.

Another object of the invention is to provide a method for tracking a stolen communication terminal, wherein the method comprises the following steps:

the camera and the GPS module are started;

the theft tracking information is obtained by the camera and the GPS module, and stored in the storage module; and the theft tracking information is sent to the standby server.

The method for tracking a stolen communication terminal is provided, wherein, the method further comprises:

determining whether a password is correct verified by a password unit; if the password is correct, the communication terminal is turned on normally, otherwise;

requesting resubmission of the password and determining whether the password is correct is verified again by the password unit. If the password is correct, the communication terminal is turned on normally. Otherwise, the step of sending the theft tracking information is performed.

The method for tracking a stolen communication terminal is provided, wherein, the method further comprises: an anti-theft protection information is preset in the communication terminal.

Still another object of the invention is to provide a communication terminal for theft tracking, wherein the communication terminal comprises: a radio frequency module, a camera for taking pictures, a storage module for storing data, a baseband module for setting anti-theft protection information, and a GPS module for obtaining the current positioning information of a communication terminal; the radio frequency module, the camera, the storage module and the GPS module are connected with the baseband module.

The communication terminal for theft tracking is provided, wherein the communication terminal further comprises a password unit for setting and verifying a password, and the password unit is connected with the baseband module.

The communication terminal for theft tracking is provided, wherein the camera is arranged in a front side of the communication terminal main body.

According to the system and method for tracking a stolen communication terminal and the communication terminal provided in the invention, the system comprises a communication terminal and a standby server, the communication terminal comprises a radio frequency module, a camera, a storage module, a GPS module and a baseband module. When the communication terminal is stolen, a facial picture of the thief is obtained by the camera. Simultaneously, the current positioning information of the communication terminal is obtained by the GPS module. The facial picture and the positioning information are sent to the standby server. The owner may obtain the pictures and positioning information returned by the communication terminal through the preset standby server, so that the stolen communication terminal may be recovered by means of reporting to the police, and the loss of the owner may be reduced as much as possible. Simultaneously, it is also convenient for the police to obtain a clue of the stolen communication terminal and evidences of the theft to catch criminals.

DETAILED DESCRIPTION OF THE INVENTION

The invention provides a system and method for tracking a stolen communication terminal and a communication terminal. To make the objects, technical solutions and effects of the invention more clear and definite, the invention will be further described in details with reference to drawings and examples. It should be understood that any specific embodiment described herein is only used for explaining the invention, instead of limiting the invention.

Figure 1:
FIG. 1 is a diagram of a system for tracking a stolen communication terminal, provided in an embodiment according to the invention.

With reference to FIG. 1, the system for tracking a stolen communication terminal 100 provided in an embodiment of the invention comprises a communication terminal 100 and a standby server 200. The communication terminal 100 is a mobile phone that is used for sending theft tracking information to the standby server 200, and the standby server 200 is a standby communication terminal or standby email box that is used for receiving the theft tracking information sent by the communication terminal 100.

In this system, there may be a plurality of communication terminals 100. Simultaneously, the communication terminal 100 may also serve as a standby server 200 to receive the theft tracking information sent by other communication terminals 100. The theft tracking information includes pictures of the thief (i.e., photos of the thief) and positioning information of the communication terminal 100.

Figure 2:
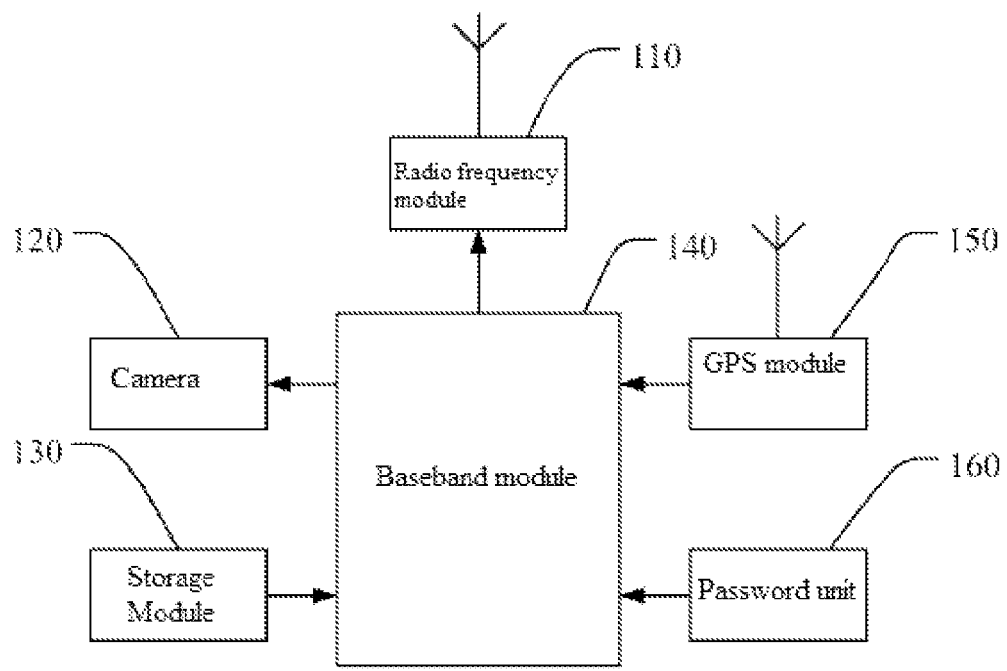
FIG. 2 is a diagram of a communication terminal, provided in an embodiment according to the invention.

With reference to FIG. 2, the communication terminal 100 comprises a radio frequency module 110, a camera 120, a storage module 130, a baseband module 140 and a GPS (Global Positioning System) module 150. The radio frequency module 110, the camera 120, the storage module 130 and the GPS module 150 are connected with the baseband module 140.

The radio frequency module 110 is configured to receive and send information. The camera 120 is configured to take pictures. Aside from being used for normally taking pictures, the camera 120 is further configured to take facial pictures of the thief or user, when the SIM card is replaced.

The storage module 130 is configured to store pictures taken by the camera 120 and other data information of the communication terminal 100. The baseband module 140 is configured to set the anti-theft protection information and realize the baseband function of the communication terminal 100. The GPS module 150 is configured to automatically obtain the current positioning information of the communication terminal 100 when the SIM card of the communication terminal 100 is replaced.

To make the communication terminal 100 able to take the facial pictures of the thief, the camera 120 is arranged in the front side of the communication terminal 100, and the picture-taking process is performed at the background without any noises. After the SIM card of the communication terminal 100 is replaced and the communication terminal 100 is turned on, the baseband module 140 controls the camera 120 and the GPS module 150 is operated. When the baseband module 140 detects the first key-pressing operation of the communication terminal 100, it controls the camera 120 and the GPS module 150 to take pictures and perform the GPS positioning, respectively.

To protect privacy of the owner, the communication terminal 100 further comprises a password unit 160, and the password unit 160 is connected with the baseband module 140 and used for setting and verifying the password. When the SIM card of the communication terminal 100 is replaced, it is necessary to input correct password information for identity identification in order to normally start the communication terminal 100.

Figure 3:
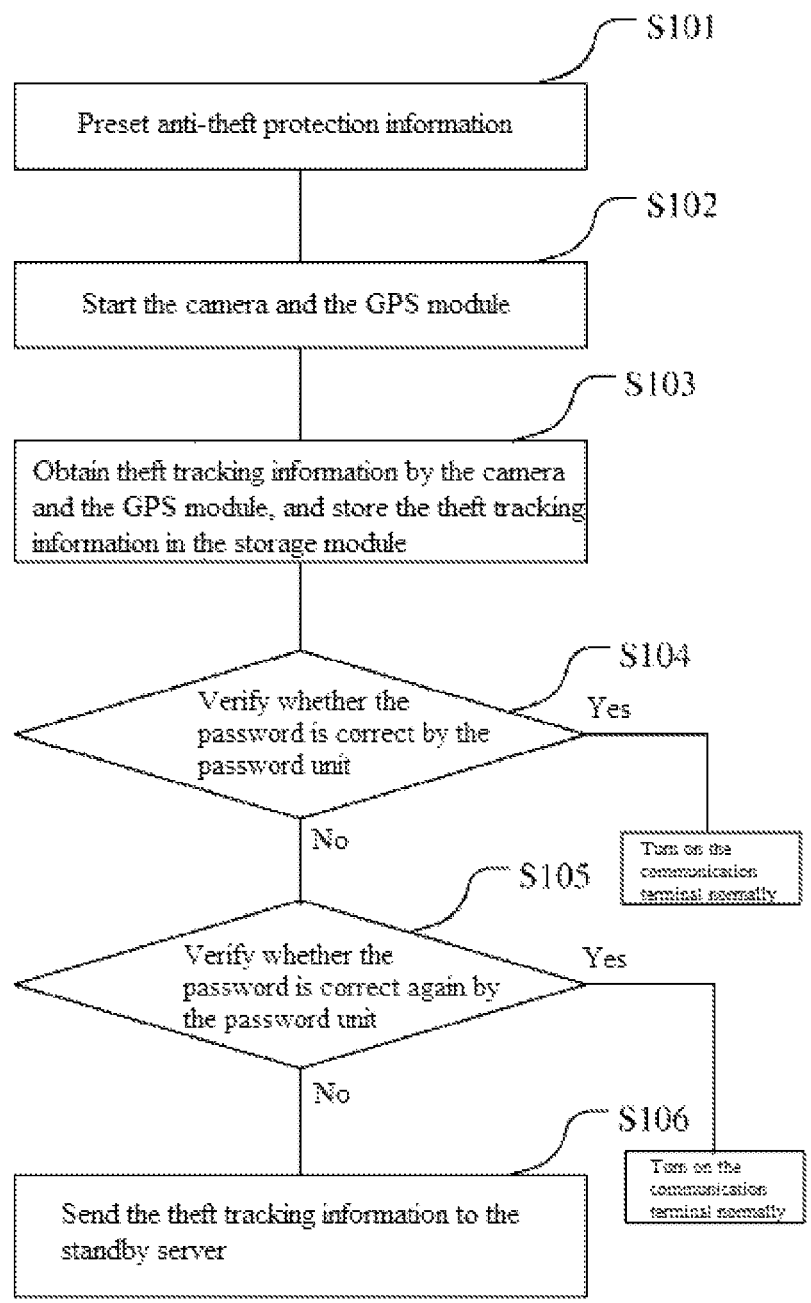
FIG. 3 is a flow chart of a method for tracking a stolen communication terminal, provided in an embodiment according to the invention.

With reference to FIG. 3, the method for tracking a stolen communication terminal provided in an embodiment of the invention comprises the following steps:

S101: The anti-theft protection information is preset.

A user may set a password by selecting an "Anti-theft Protection" function in the menu of a communication terminal to identify the identity of the user. The user also sets, in the storage module, a SIM card number of a standby communication terminal or an email address of a standby email box to receive the tracking information in the event the communication terminal is stolen.

After the user sets the "Anti-theft Protection" function, the communication terminal will be bound with the current SIM card. Each time the communication terminal is turned on, it checks whether the information of the current SIM card is consistent with the information of the bound SIM card. If the SIM card is replaced, the communication terminal will require the user to input the password for identity identification. If the user needs to change the anti-theft protection information, password verification is also required to prevent other persons from tampering with the anti-theft protection information.

S102: The camera and the GPS module are started.

When the communication terminal is stolen, the thief will generally replace the SIM card. After the SIM card is replaced and the communication terminal is turned on, the baseband module controls the camera and the GPS module to start.

S103: The theft tracking information is obtained by the camera and the GPS module and the theft tracking information is stored in the storage module.

After the camera and the GPS module are started, when the baseband module detects the first key-pressing operation of the communication terminal, facial pictures of the thief are taken. Simultaneously, the positioning information of the communication terminal is obtained by the GPS module and the positioning information is stored in the storage module.

In the present embodiment, with the camera is arranged in the front side of the communication terminal, the camera is able to take the facial pictures of the thief and the whole picture-taking process is performed in the background. In this way, this action will not be discovered by the thief.

S104: Determining whether an input password is correct is verified by the password unit. If the password is correct, the communication terminal is turned on normally, otherwise S105 is executed.

After pictures are taken, a password input dialog box will pop up on the display screen of the communication terminal to verify the password input by the user. If the password verification is successful, the communication terminal is turned on normally, and the camera and the GPS module are turned off. If the password verification is failed, the following step is executed.

S105: Determining whether the input password is correct is verified again by the password unit. If the password is correct, the communication terminal is turned on normally, otherwise S106 is executed.

When the first password input is not correct, the process of password verification has to be repeated once again. If the password input is correct at this time, the communication terminal will be turned on normally. If the password is not correct, the communication terminal will enter the stolen protection state, and the following step is executed.

S106: The theft tracking information is sent to the standby server.

After the communication terminal enters the stolen protection state, pictures taken by the camera and positioning information (i.e., theft tracking information) obtained by the GPS module are sent to the preset standby communication terminal or standby email box through the radio frequency module. Simultaneously, functions of the communication terminal are locked, so that it can only have Save Our Souls (SOS, International Morse saving code) dialup, instead of having functions such as short message and contact list, in order to protect privacy of the owner.

In a further embodiment, if the communication terminal is not turned off, it will send the GPS positioning information once to the standby server at regular intervals (for example, 5 min). If the communication terminal is turned off and restarted, the above step will be repeated until the password input is correct.

Based on the system and method for tracking a stolen communication terminal, the embodiment of the invention also provides a communication terminal for theft tracking. Correspondingly, the communication terminal comprises a radio frequency module, a camera, a storage module, a baseband module and a GPS module. As the communication terminal has been described in details above, it will not be described again herein.

In conclusion, according to the system and method for tracking a stolen communication terminal and the communication terminal provided in the invention, the system comprises a communication terminal and a standby server. The communication terminal comprises a radio frequency module, a camera, a storage module, a GPS module and a baseband module. When the communication terminal is stolen, facial pictures of the thief are obtained by the camera. Simultaneously, the current positioning information of the communication terminal is obtained by the GPS module. The facial picture and the positioning information are sent to the standby server. The owner may obtain the pictures and positioning information returned by the communication terminal through the preset standby server, so that the stolen communication terminal may be recovered by means of reporting to the police and the loss of the owner may be reduced as much as possible. Simultaneously, it is also convenient for the police to obtain a clue for locating the stolen communication terminal and evidence of the theft to catch criminals.

It should be understood that, for those skilled in the art, the invention may have equivalent replacements or alternatives according to the technical solution and conception of the invention, and all these alternatives and replacements should be included within the protection scope defined by the claims of the invention.

The invention claimed is:

1. A system for tracking a stolen communication terminal, comprising:
    a communication terminal; and
    a standby server for receiving theft tracking information from the communication terminal,
    wherein the communication terminal includes:
        a radio frequency module, a camera for taking pictures, a storage module for storing data, a baseband module for setting anti-theft protection information, and
        a Global Positioning System (GPS) module for obtaining current positioning information of the communication terminal, wherein the radio frequency module, the camera, the storage module, and the GPS module are connected with the baseband module,
    wherein the camera and the GPS module are turned off and the communication terminal is turned on in response to a verified password input.

2. The system for tracking a stolen communication terminal according to claim 1, further comprising a password unit for setting and verifying the password input, wherein the password unit is connected with the baseband module.

3. The system for tracking a stolen communication terminal according to claim 1, wherein the standby server is a standby communication terminal or a standby email box.

4. The system for tracking a stolen communication terminal according to claim 1, wherein the baseband module is configured to send theft tracking information, and wherein the theft tracking information includes pictures taken by the camera and the current positioning information obtained by the GPS module.

5. The system for tracking a stolen communication terminal according to claim 1, wherein the anti-theft protection information is bound to a Subscriber Identity Module (SIM) card on the communication terminal.

6. The system for tracking a stolen communication terminal according to claim 5, wherein the camera is configured to take pictures when the SIM card is replaced.

7. The system for tracking a stolen communication terminal according to claim 6, wherein the GPS module is configured to automatically obtain the current positioning information when the SIM card is replaced.

8. The system for tracking a stolen communication terminal according to claim 1, wherein the camera is arranged on the communication terminal to take a picture of a thief.

9. A method for tracking a stolen communication terminal, comprising:
    starting a camera and a Global Positioning System (GPS) module on the communication terminal;
    obtaining theft tracking information provided by the camera and the GPS module;
    storing the theft tracking information in a storage module;
    sending the theft tracking information to a standby server; and
    turning off the camera and the GPS module on the communication terminal and the turning on of the communication terminal in response to a verified password input.

10. The method for tracking a stolen communication terminal according to claim 9, the method further comprising:
    determining whether the password input into the communication terminal is correct is verified by a password unit.

11. The method for tracking a stolen communication terminal according to claim 9, the method further comprising:
    presetting anti-theft protection information into the communication terminal.

12. The method for tracking a stolen communication terminal according to claim 10, the method further comprising determining whether the password is correct is verified again by the password unit, and if the password is correct, the communication terminal is turned on, and if incorrect, the step of sending the theft tracking information is performed.

13. The method for tracking a stolen communication terminal according to claim 11, wherein the preset anti-theft protection information is bound to a Subscriber Identity Module (SIM) card on the communication terminal.

14. The method for tracking a stolen communication terminal according to claim 13, further comprising checking if information on a SIM card currently in the communication terminal is consistent with the preset anti-theft protection information.

15. A communication terminal for theft tracking, comprising:
    a radio frequency module;
    a camera configured to take pictures;
    a storage module configured to store data;
    a baseband module configured to set anti-theft protection information in the storage module; and
    a Global Positioning System (GPS) module for obtaining current positioning information of the communication terminal, wherein the radio frequency module, the camera, the storage module and the GPS module are connected with the baseband module, wherein the camera and the GPS module are turned off and the communication terminal is turned on in response to a verified password input.

16. The communication terminal for theft tracking according to claim 15, further comprising a password unit for setting and verifying the password input, wherein the password unit is connected with the baseband module.

17. The communication terminal for theft tracking according to claim 15, wherein the camera is arranged in a front side of a main body of the communication terminal.

18. The communication terminal according to claim 15, wherein the anti-theft protection information is bound to a Subscriber Identity Module (SIM) card on the communication terminal.

19. The communication terminal according to claim 18, wherein the camera is configured to take pictures when the SIM card is replaced.

20. The communication terminal according to claim 18, wherein the GPS module is configured to automatically obtain the current positioning information when the SIM card is replaced.

\* \* \* \* \*